United States Patent
Wolff

(10) Patent No.: US 8,935,881 B2
(45) Date of Patent: Jan. 20, 2015

(54) METHOD AND DEVICE FOR EVALUATING GERMINATION PROPERTIES OF PLANT SEEDS

(75) Inventor: Antje Wolff, Timmendorfer Strand (DE)

(73) Assignee: Strube GmbH & Co. KG, Soellingen (DE)

( * ) Notice: Subject to any disclaimer, the term of this patent is extended or adjusted under 35 U.S.C. 154(b) by 0 days.

(21) Appl. No.: 13/574,298

(22) PCT Filed: Jan. 18, 2011

(86) PCT No.: PCT/EP2011/050567
§ 371 (c)(1),
(2), (4) Date: Sep. 14, 2012

(87) PCT Pub. No.: WO2011/089102
PCT Pub. Date: Jul. 28, 2011

(65) Prior Publication Data
US 2013/0000194 A1    Jan. 3, 2013

(51) Int. Cl.
*A01C 1/02*    (2006.01)
(52) U.S. Cl.
CPC ..................... *A01C 1/025* (2013.01)
USPC ........................... 47/58.1 R; 47/14
(58) Field of Classification Search
USPC .................................. 47/58.1 R, 14
See application file for complete search history.

(56) References Cited

U.S. PATENT DOCUMENTS

| 5,462,879 A * | 10/1995 | Bentsen ............... 436/136 |
| 5,864,984 A * | 2/1999 | McNertney ............ 47/58.1 R |
| 7,367,155 B2 | 5/2008 | Kotyk et al. |
| 2006/0143731 A1* | 6/2006 | Timmis et al. ............ 800/278 |

FOREIGN PATENT DOCUMENTS

| DE | 39 06 215 | 8/1990 |
| WO | 93/13491 | 7/1993 |
| WO | 99/56127 | 11/1999 |
| WO | 2009/128998 | 10/2009 |

OTHER PUBLICATIONS

Maisl Michael, Kasperl Stefan, Wolff Antje, Process Monitoring using Three Dimensional Computed Tomography and Automatic Image Processing, ECNDT 2006—We.3.7.1.
Maisl Michael, Kasperl Stefan, Wolff Antje, Process Monitoring using Three Dimensional Computed Tomography and Automatic Image Processing, ECNDT 2006-We.3.7.1.

* cited by examiner

*Primary Examiner* — Kristen C Hayes
(74) *Attorney, Agent, or Firm* — Hodgson Russ LLP

(57) ABSTRACT

The invention relates to a method for evaluating germination properties of plant seeds and/or of sprouts developed from the plant seeds, on the basis of anatomical characteristics (x, y) at a particular point in time, wherein determining the anatomical characteristics (x, y) at a particular point in time comprises analyzing the plant seeds and/or sprouts using at least one imaging method and obtaining three-dimensional analysis data (410) at a particular point in time, segmenting the analysis data (400) at a particular point in time and associating segments (516-519) thus obtained into anatomical units of the plant seeds and/or sprouts, and determining the anatomical characteristics (x, y) of the anatomical units of the plant seeds and/or sprouts at a particular point in time from the associated segments (516-519) at at least one point in time.

11 Claims, 14 Drawing Sheets

| Nr. | X | Y | Z | V (mm³) | x (mm³) | y (mm³) |
|---|---|---|---|---|---|---|
| 1 | 202 | 73 | 69 | 15,41 | 7,23 | 3,44 |
| 2 | 277 | 105 | 69 | 14,91 | 6,88 | 3,37 |
| 3 | 353 | 128 | 69 | 12,21 | 4,70 | 3,20 |
| 4 | 133 | 158 | 69 | 15,12 | 6,51 | 3,48 |
| 5 | 212 | 154 | 69 | 15,22 | 7,31 | 3,32 |
| 6 | 281 | 185 | 69 | 10,68 | 4,48 | 2,57 |
| 7 | 357 | 207 | 69 | 10,97 | 4,25 | 2,73 |
| 8 | 438 | 198 | 69 | 14,54 | 6,41 | 3,59 |
| 9 | 111 | 236 | 69 | 15,43 | 6,93 | 3,62 |
| 10 | 191 | 230 | 69 | 10,71 | 5,25 | 2,46 |
| 11 | 326 | 276 | 69 | 13,27 | 6,56 | 2,59 |
| 12 | 406 | 271 | 69 | 12,29 | 5,25 | 3,00 |
| 13 | 77 | 309 | 69 | 14,13 | 6,57 | 3,40 |
| 14 | 158 | 300 | 69 | 14,71 | 8,11 | 3,23 |
| 15 | 235 | 320 | 69 | 13,27 | 5,93 | 3,35 |
| 16 | 304 | 352 | 69 | 13,22 | 5,39 | 3,17 |
| 17 | 384 | 349 | 69 | 13,14 | 5,99 | 2,93 |
| 18 | 163 | 379 | 69 | 12,03 | 5,71 | 3,01 |
| 19 | 239 | 401 | 69 | 13,35 | 8,19 | 2,31 |
| 20 | 314 | 433 | 69 | 16,50 | 8,59 | 3,56 |
| 21 | 202 | 74 | 142 | 14,94 | 4,92 | 3,95 |
| 22 | 276 | 106 | 142 | 13,42 | 5,16 | 3,93 |
| 23 | 352 | 129 | 142 | 14,84 | 6,42 | 3,63 |
| 24 | 131 | 159 | 142 | 15,72 | 6,57 | 4,17 |
| 25 | 211 | 155 | 142 | 11,71 | 4,50 | 3,41 |
| 26 | 280 | 186 | 142 | 15,19 | 4,98 | 4,47 |
| 27 | 357 | 207 | 142 | 13,36 | 5,94 | 3,45 |
| 28 | 437 | 199 | 142 | 14,82 | 6,04 | 3,96 |
| 29 | 110 | 237 | 142 | 13,70 | 5,16 | 3,84 |
| 30 | 191 | 230 | 142 | 11,73 | 4,60 | 3,25 |
| 31 | 325 | 277 | 142 | 17,12 | 6,83 | 4,34 |
| 32 | 405 | 271 | 142 | 15,77 | 6,76 | 4,14 |
| 33 | 77 | 310 | 142 | 17,48 | 7,18 | 4,23 |
| 34 | 157 | 300 | 142 | 14,00 | 5,82 | 3,78 |
| 35 | 234 | 321 | 142 | 17,28 | 5,82 | 4,62 |
| 36 | 303 | 353 | 142 | 13,71 | 5,79 | 3,33 |
| 37 | 383 | 349 | 142 | 15,28 | 4,93 | 4,13 |
| 38 | 163 | 379 | 142 | 14,93 | 6,19 | 3,72 |
| 39 | 238 | 402 | 142 | 13,87 | 5,60 | 3,65 |
| 40 | 313 | 433 | 142 | 16,03 | 7,04 | 4,31 |
| 41 | 200 | 75 | 217 | 18,37 | 7,47 | 4,43 |
| 42 | 275 | 108 | 217 | 13,94 | 4,82 | 3,76 |
| 43 | 350 | 130 | 217 | 13,45 | 6,13 | 3,50 |
| 44 | 130 | 160 | 217 | 16,75 | 6,86 | 3,85 |
| 45 | 209 | 156 | 217 | 15,73 | 8,02 | 3,82 |
| 46 | 279 | 186 | 217 | 20,45 | 8,95 | 4,73 |
| 47 | 354 | 208 | 217 | 15,17 | 6,47 | 3,73 |
| 48 | 436 | 200 | 217 | 17,40 | 8,20 | 4,13 |
| 49 | 108 | 237 | 217 | 15,84 | 7,16 | 3,83 |
| 50 | 189 | 232 | 217 | 15,66 | 7,56 | 3,73 |

Fig. 6

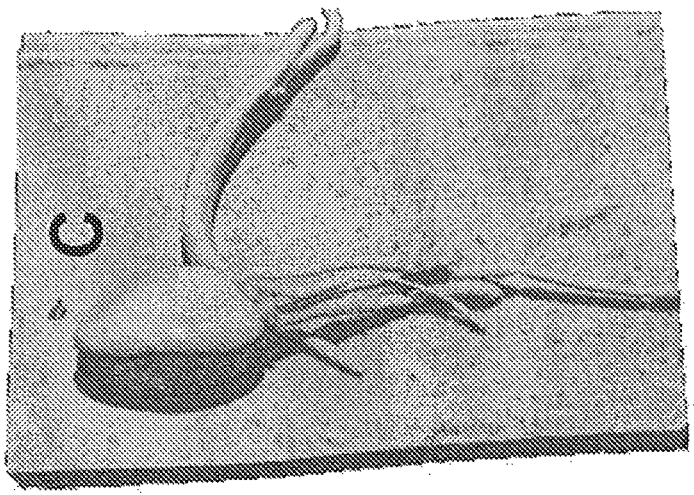
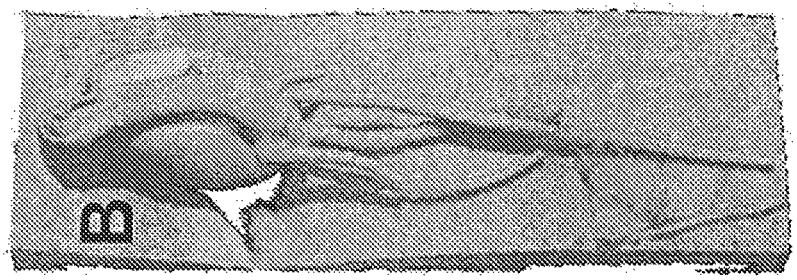
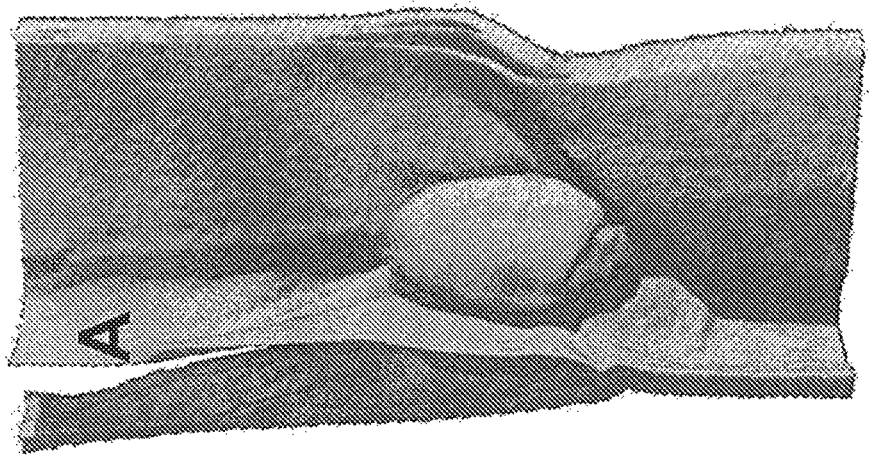
Fig. 12

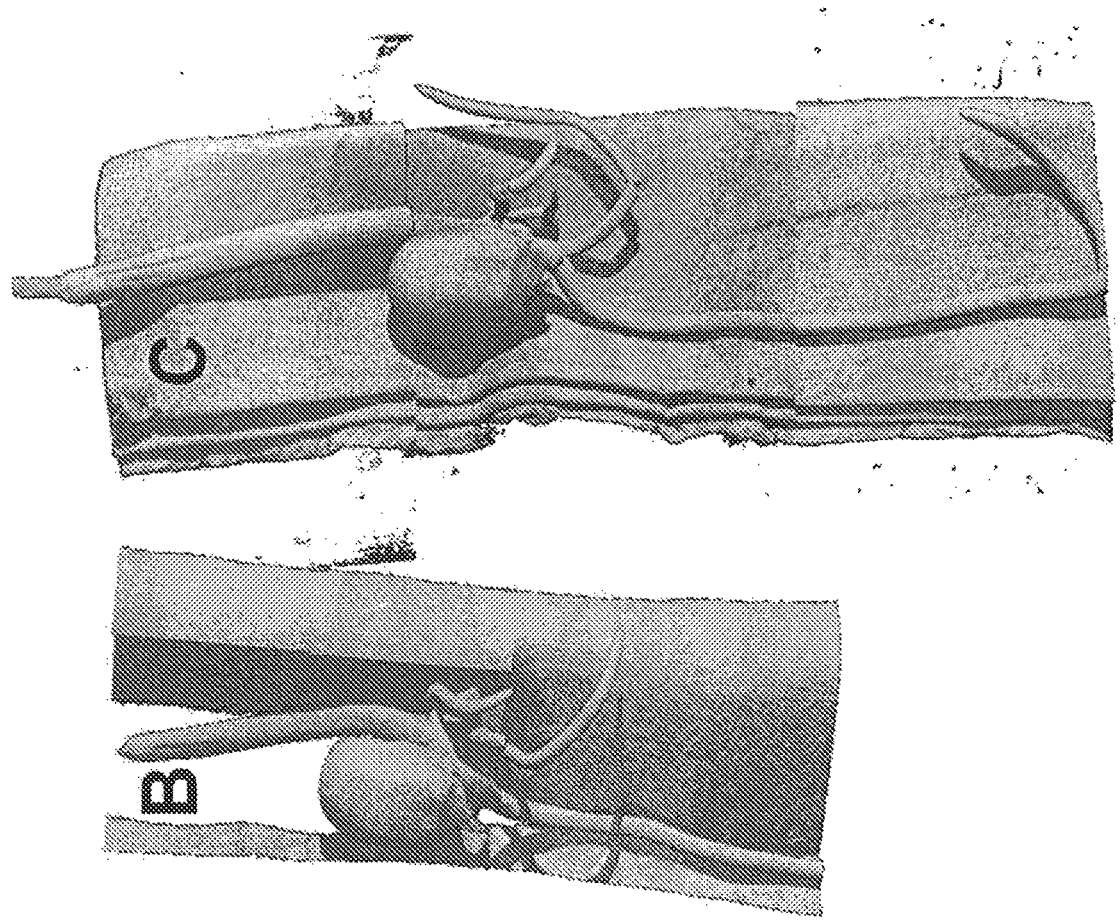
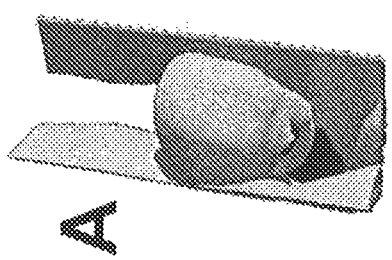
Fig. 13

METHOD AND DEVICE FOR EVALUATING GERMINATION PROPERTIES OF PLANT SEEDS

CROSS REFERENCE TO RELATED APPLICATIONS

The present application is the U.S. National Stage of International Application No. PCT/EP2011/050567 filed Jan. 18, 2011, which claims priority of German Application No. 102010001111.8-23 filed Jan. 21, 2010. The present application claims priority benefit of International Application No. PCT/EP2011/050567 and German Application No. 102010001111.8-23.

FIELD OF THE INVENTION

The present invention relates to a method for evaluating germination properties of plant seeds and/or seedlings developing from the plant seeds on the basis of anatomical features relating to a particular moment in time, and to a device which is adapted for carrying out the method.

BACKGROUND OF THE INVENTION

Although the following description refers primarily to sugar beet seeds, the invention is not restricted to these but is fundamentally applicable to all plants that are of agricultural or scientific importance.

Also in order to satisfy statutory requirements in seed testing, seeds must have certain minimum quality features in order to ensure adequate emergence and growth in the field. The quality of the seeds is a co-determinant in enabling the genotypical yield and quality features in question to develop.

The objective of seed research is, among other things, to obtain the best possible assurance of an early, high and uniform emergence, a high emergence speed, good growth performance and high stress tolerance. This is intended among other things to achieve the greatest possible uniformity of growth, i.e. of the developing plants and of the plants when ready for harvesting, and a high and uniform yield in terms of both quantity and quality.

In the propagation culture which is used to obtain seeds, the influence of the cultivation measures on the seed properties is investigated and monitored. On this basis, new suitably tailored production methods are developed in order to increase and stabilise the yields and quality of the raw seed material.

One quality feature of seeds is their minimum germination capacity. This is generally determined by the methods of the International Seed Testing Association (ISTA).

The seeds are germinated in moistened filter paper of a defined quality under controlled humidity and temperature conditions over a specific period of time. After this time the seeds that have germinated are counted manually.

It is known that certain morphological, anatomical and physiological seed properties have a critical influence on the germination and emergence characteristics in the field.

To obtain further information on the quality of, for example, sugar beet seeds, a number of different test methods are known that can be used for estimating, for example, the emergence potential under field conditions. An overview of this is provided by H. P. Draycott (Editor): "Sugar beet", World Agriculture Series, Blackwell Publishing, 2006.

Known methods for determining germination properties often have the disadvantage that the evaluation is based on decision criteria that cannot or cannot easily be objectivised. Moreover, conventional methods only provide limited information allowing the prospective evaluation of seed, i.e. a prediction of its germination characteristics and particularly its growing power in the field. Seed with a high germination capacity does not necessarily also have good growing power. Thus the germination capacity on its own does not allow any prediction to be made, for example, as to the stress tolerance of the developing plants.

Conventional processes are in addition often labour-intensive and require high staffing levels. As the tests used are essentially manual, certain parameters are dependent on individual assessment by the test staff and are therefore difficult to standardise. A further restriction regarding standardisation results from test media which are not always available in uniform quality, such as for example the (standard) soils required to make the examinations comparable.

The corresponding tests moreover generally take place under certain defined laboratory conditions in which only one particular parameter (humidity, soil coverage, etc.) is investigated at any one time. It is therefore difficult to draw any conclusions as to the field characteristics.

There is therefore a need for automated, preferably fully automatic, objective test methods for evaluating the germination capacity and germination quality of seeds.

SUMMARY OF THE INVENTION

The present invention makes it possible to obtain a qualitative non-destructive documentation of the development of seeds up to the plant stage, above and below ground, including leaves and roots (beets or turnips). For this purpose, for example, seeds are first of all examined in a medium by an imaging tomography process and are then moved into a germination chamber for further cultivation. In a staggered time sequence, fresh investigations are carried out throughout the course of germination. Thanks to the largely automated progress of the method, any desired investigation intervals can be used which are no longer dependent on the availability of staff.

It is particularly advantageous for the investigations to take place while the seeds are in a germination substrate. The germination substrate used may be the pleated filters conventionally used in germination tests, but the method envisaged is also suitable for investigating germination in other media such as, for example, in soil.

Using the method envisaged, plant seeds or seedlings developing from them are examined using at least one imaging process, obtaining investigation data relating to a particular point in time at at least one point in time.

The investigation data relating to a particular point in time obtained are then subjected, in the form of 3D image data, to an image processing method or algorithm. Within the scope of these image processing methods the seeds imaged and the developing germinated plants are first segmented from the germination substrate, for example a pleated filter or soil.

By the term "segmenting" is meant, within the scope of this application, the allocation of imaged areas or areas of investigation data, to areas of an object being investigated, which is carried out particularly using computer-aided image processing techniques.

In addition to the segmenting of imaged seeds or seedlings on the one hand and the germination substrate on the other hand, there is also a segmenting and allocation of image segments to anatomical units of the plant seeds or seedlings.

Features of these anatomical units based on the particular investigation time are derived from the correspondingly allocated anatomical units or the image areas corresponding thereto. The derivation of the properties may advantageously be carried out using an algorithm by means of which image areas can be measured three-dimensionally.

The evaluation of the germination properties of the plant seeds then takes place on the basis of the anatomical features relating to a particular point in time thus obtained.

By "germination properties" is meant, in addition to the minimum germination characteristics, the quality of emergence, the speed of emergence, the growth performance, the stress tolerance, the uniformity of growth, the quality of the seedlings such as the length and/or volume of the shoot and root, the speed of development and substance characteristics thereof and possibly other properties derived from these. Thus a germination characteristic may also be a characteristic of a seedling that has emerged from the plant seed as a result of germination (for example the size of the cotyledons and the size, length and substance properties of roots) and particularly the development of this property over time. However, it also encompasses properties of seeds which can be attributed to it as a result of a method according to the invention (i.e. predicted properties such as the probable minimum germination capacity or speed of emergence). The colour of the tissue (black coloration) makes it possible to comment on a possible fungus attack on the seedlings at the end of the germination period.

Particularly advantageously, computer tomographic, magnetic resonance tomographic and/or optical imaging processes can be used within the scope of the method. Computer tomography and magnetic resonance tomography, in particular, allow a non-destructive three-dimensional measurement of germinated plants or seeds in a germination substrate which does not need to be removed in order to examine the material. As a result, the plants can be measured in a completely non-disruptive and non-destructive manner without any effect on germination.

Particularly advantageously, the seeds or seedlings are introduced into the beam path of an x-ray or magnetic resonance tomograph, rotated in the beam path thereof and subjected to spatially resolved imaging tomography.

Moreover, in addition to the tomographic processes envisaged, an optical examination may also be advantageous. For example, at the end of the germination period or a corresponding investigation time, an assessment can be made using one or more imaging sensors such as for example a colour camera, whereby the hypocotyl colour, for example, and any possible colour change that may have occurred as a result of fungal infection can be detected, or using a magnetic resonance method.

Particularly advantageously, the plant seeds or the seedlings developing from them under controlled conditions are incubated in a germination device, for example a phytochamber. Before the investigation the seeds or seedlings are introduced, for example, into the magnetic resonance tomograph, preferably fully automatically, and then returned to the germination device.

As already mentioned, by the use of computer or magnetic resonance tomography processes, plant seeds and/or seedlings can be investigated in a freely selectable germination substrate that has only to be adapted to the particular method of investigation. This substrate may for example consist of the pleated filters mentioned above, soil or any other suitable medium. Thanks to this possibility, different growth conditions, for example different soil qualities, can be simulated.

Particularly advantageously, the method comprises investigating plant seeds in the dry state, moistened plant seeds and/or seedlings at different times. For example, first of all, tissue parts of dry seeds may be analysed by examination, segmenting and derivation of the anatomical features relating to a particular point in time. For this purpose the seeds are positioned, for example, between the pleats of a vertically positioned pleated filter and the filter containing the seeds is introduced, initially in a dry state, into the beam path of the x-ray or magnetic resonance tomograph.

The pleated filter is then moistened in a defined manner and exposed to controlled germination conditions. At specific intervals of time during germination (automatic) tomography is carried out with subsequent image evaluation, as explained previously, as a result of which, in addition to the three-dimensional data obtained, it becomes possible to describe a fourth dimension, namely the development of tissue parts over time.

It is seen as particularly advantageous to use the method described above to detect, as anatomical units of the plant seeds, the hard pericarp, the soft pericarp, the embryo and/or the endosperm tissue, as these anatomical structures provide particularly compelling data for assessing the germination properties. In the same way, in the seedlings, the radicle, the hypocotyl and/or the cotyledons, in particular, are studied.

The various anatomical features relating to a particular point in time comprise, in particular, a volume, an area, a dimension (length, width/breath) and/or, if it can be detectable by the imaging method used, coloration of the anatomical units. The volume of the endosperm tissue makes it possible to draw conclusions, for example, as to the supply of nutrients to the embryo and hence the germination quality. The volume or area of the cotyledons, on the other hand, allows conclusions to be drawn as to the assimilation capacity of the developing seedlings. The length and strength of the hypocotyl make it possible to comment on its stretching potential. The faster the cotyledons penetrate through, for example, muddy soil as a result of hypocotyl stretching and are able to start to assimilate sunlight, the earlier and more effectively the formation of the substance and hence the yield can begin. The rate of growth, the length and the branching of the roots allows conclusions to be drawn as to the water supply and the anchoring of the seedlings in the soil.

As already explained, the method described makes it possible, particularly advantageously, to evaluate the germination capacity and/or germination quality of the plant seeds, even in advance. The method according to the invention therefore provides a particularly simple and advantageous manner of establishing an automatic germination test which is suitable for replacing, objectivising and automating conventional test methods.

As also already stated, the evaluation of the germination properties may include an appreciation of the anatomical features relating to a particular point in time over a predetermined period, which correlates, for example, with time segments of a germination period that are regarded as significant.

Particularly advantageously, the evaluation of the germination properties encompasses the comparison of the anatomical features relating to a particular point in time with comparative and/or threshold values. This is a particularly simply manner of correlating features that have been observed with comparative values and of commenting on the order of magnitude of the developing seedlings or their properties. The comparison with threshold values can also be used in particular to evaluate seed batches.

In order to be able to derive more accurate information as to germination properties it may be advantageous to carry out a statistical evaluation of the anatomical features relating to a particular moment. By, for example, taking the average of a large number of measurements of different individuals (large random sample) it is possible to eliminate the biological (intravarietal) variations within a species or treatment.

The method may also include correlating a germination development with properties of anatomical features of the dry seeds. For example, it is possible to statistically classify the types of development, over time, of all or some of the features and then assign them to the relevant seed features. In this way it is possible to reach a prognosis, based on the seed features, as to the germination properties that can be expected and, for example, to grade seeds into superior or inferior grades within the scope of the production of quality seeds.

Advantageously, the process according to the invention makes it possible to evaluate the germination properties while simulating stress factors (drought, unfavourable soil type). For example, for this purpose, the water content of the filter paper used as the germination substrate may be changed, there may be a change in the depth of placement of the seeds in the filter and/or the filter pleats of a vertically positioned filter may be more or less compacted above and below the seed. On the basis of the automatic image evaluation, the qualitative statements derived therefrom and the absolute standardisability which is achieved in this way, the method is also suitable for the objective evaluation of germination capacity and growing power in official seed testing.

As already mentioned, the invention also relates to a device for evaluating germination properties of plant seeds. With regard to the features and advantages of the device according to the invention, reference is specifically made to the features of the method according to the invention described hereinbefore.

In particular, a device of this kind comprises means for segmenting and/or means for deriving anatomical features relating to a particular point in time which are embodied as software means, particularly in the form of computer-run algorithms.

Further features and advantages of the invention will become apparent from the description and the accompanying drawings.

It will be understood that the features mentioned hereinbefore and those to be described hereinafter may be used not only in the particular combination stated but also in other combinations or on their own without departing from the scope of the present invention.

The invention is schematically illustrated in the drawings by means of embodiments by way of example and is described in detail hereinafter with reference to the drawings.

DESCRIPTION OF THE DRAWINGS

FIG. 6 shows volume data of segmented tissues from sugar beet seed obtained by a method according to a particularly preferred embodiment of the invention.

FIG. 12 shows 3D reconstructions of germinated wheat seed according to a particularly preferred embodiment of the invention.

FIG. 13 shows 3D reconstructions of germinated maize seed according to a particularly preferred embodiment of the invention.

In the Figures that follow, identical or analogous elements such as seed or seedling features, for example, have been given the same reference numerals and are not described again, for reasons of clarity.

DETAILED DESCRIPTION OF THE INVENTION

Figure 1:
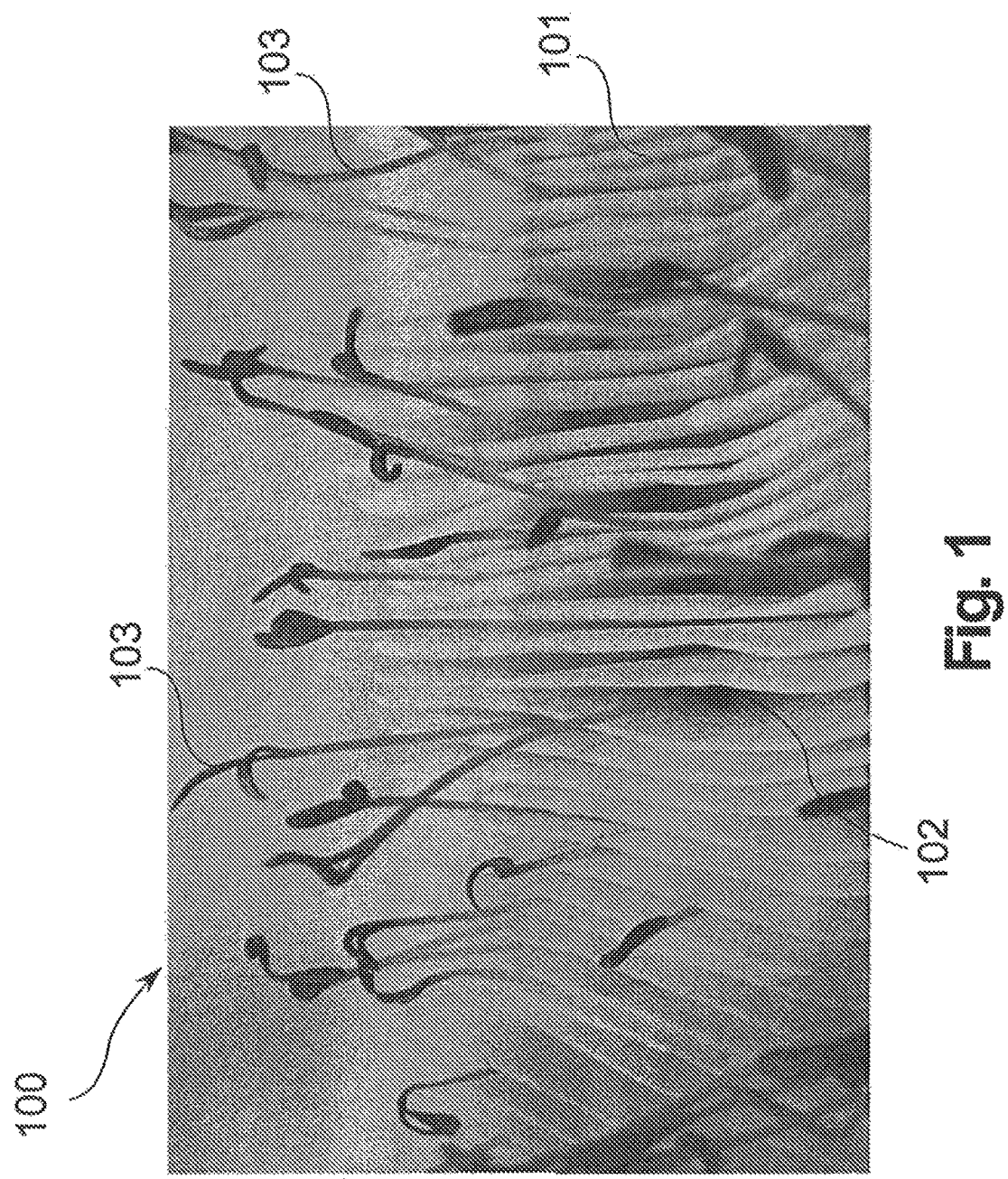
FIG. 1 shows a pleated filter with seedlings in a germination test according to the prior art.

In FIG. 1, a pleated filter with seedlings is shown as used in a germination test according to the prior art. The arrangement as a whole is designated 100. As explained previously, in conventional germination tests seed 102 is introduced into a horizontally positioned pleated filter 101 and after the addition of liquid, the seed is germinated under largely defined conditions. The seedlings 103 developing from this are then assessed, for example counted.

Figure 2:
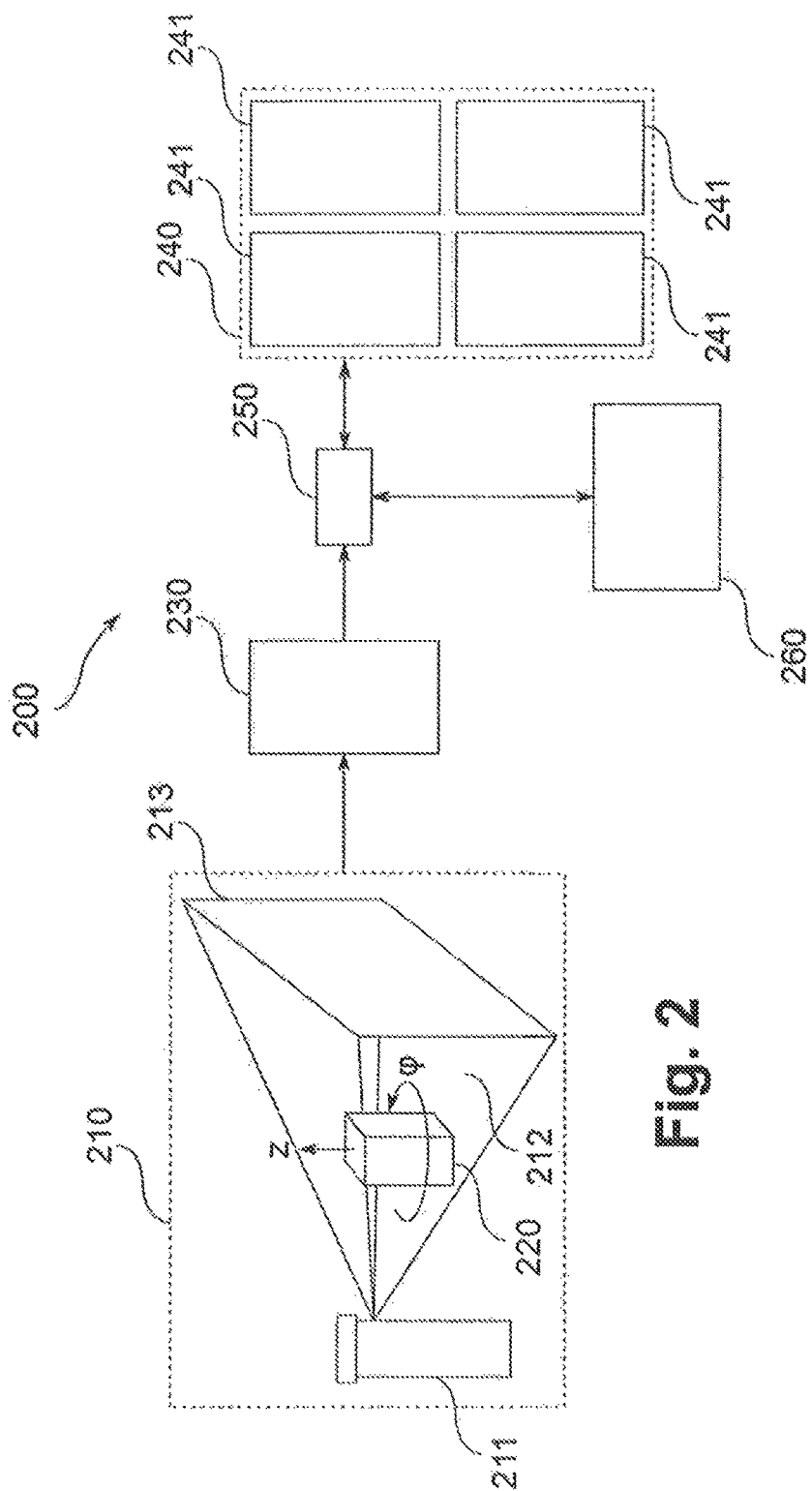
FIG. 2 schematically shows an arrangement for carrying out the method according to a particularly preferred embodiment of the invention.

FIG. 2 schematically shows an arrangement for carrying out the method according to a particularly preferred embodiment of the invention and is as a whole designated 200. The arrangement 200 comprises an X-ray device 210, for example a computer tomograph 210, having an X-ray tube 211 and an X-ray detector 213. A sample that is to be examined, for example a filter with seeds in a holding device or seedlings in substrate, is placed in the beam path 212 of the X-ray device 210. The sample is rotated in the X-ray device 210 in order to take sectional images, as illustrated by a rotary arrow φ, and pushed stepwise in the direction z.

The sectional images obtained are processed for example by means of a measuring computer 230. The measured data delivered by the measuring computer 230 via a high speed network 250 are reconstructed by means of a high speed computing device 240, for example a cluster of individual computers 241, and supplied to an evaluating or visualising computer 260.

Figure 3:
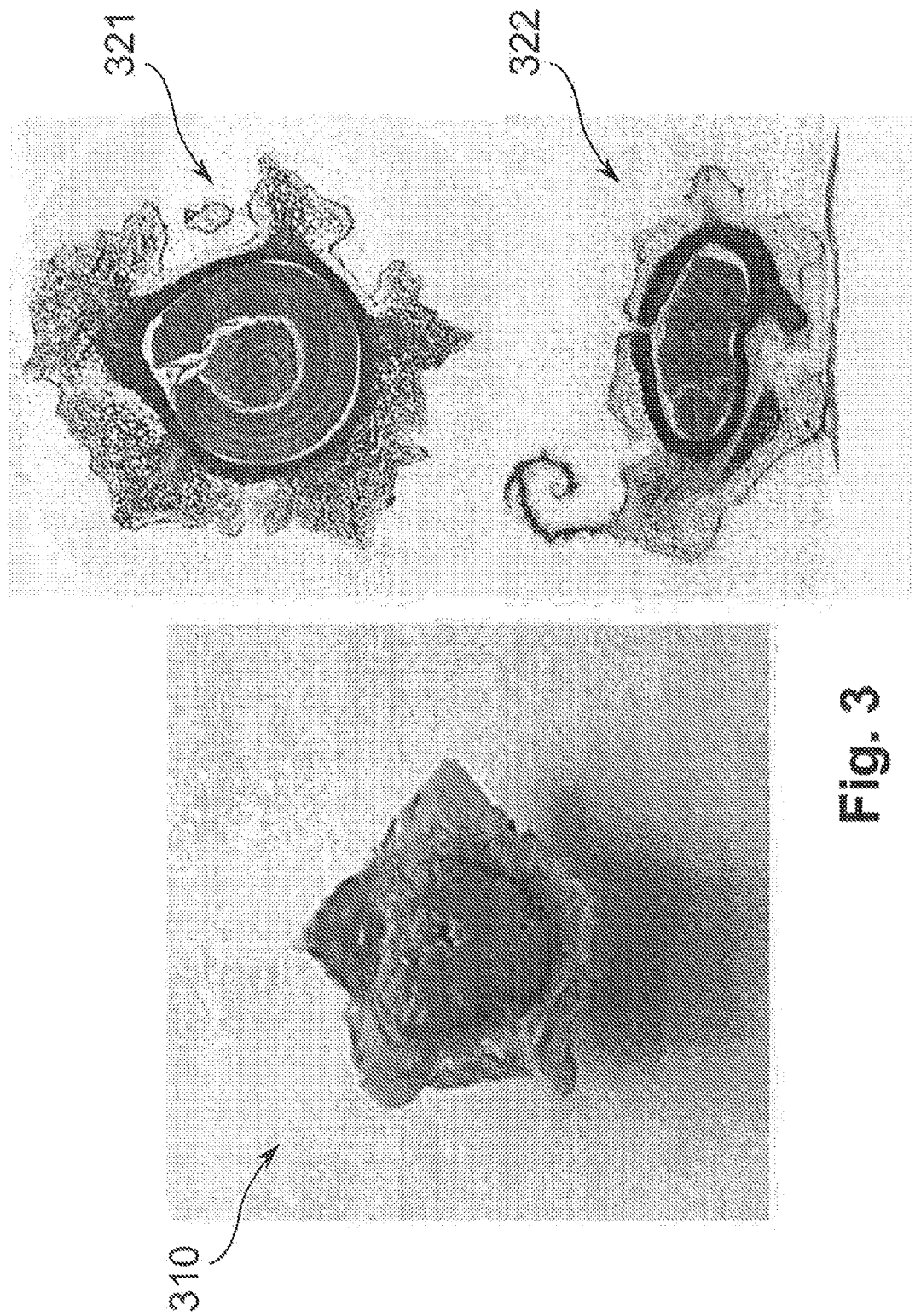
FIG. 3 shows photographs of sugar beet seeds using imaging techniques.

FIG. 3 shows images of sugar beet seed obtained by imaging techniques. Image 310 shows a conventional digital photograph of a sugar beet seed or seed ball. Image 321 is a computer-tomographic cross-sectional view of the sugar beet seed, the direction of the plane of section corresponding substantially to that of the plane of the image 310. The computer tomographic longitudinal view which is taken perpendicularly thereto is shown in image 322.

Figure 4:
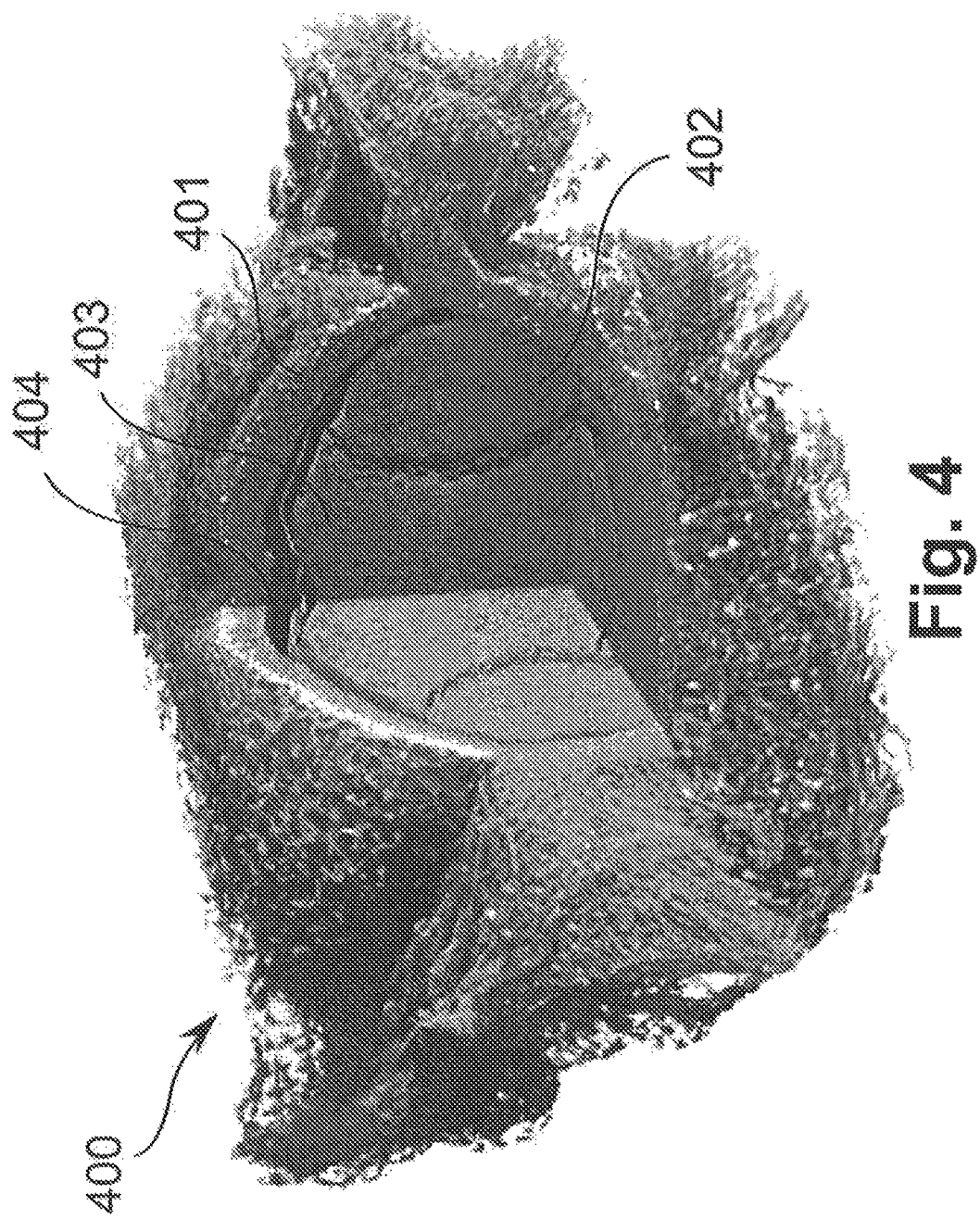
FIG. 4 shows a partial sectional view of a 3D reconstruction of a sugar beet seed from computer-tomographic images.

FIG. 4 shows a partial sectional view of a 3D reconstruction 400 of a sugar beet seed from computer tomographic images such as those in FIG. 3. In the representation 400, the seed husk 401, the cotyledon arrangement 402, the endosperm tissue 403 and a cavity 404 in the seed can be optically differentiated.

Figure 5:
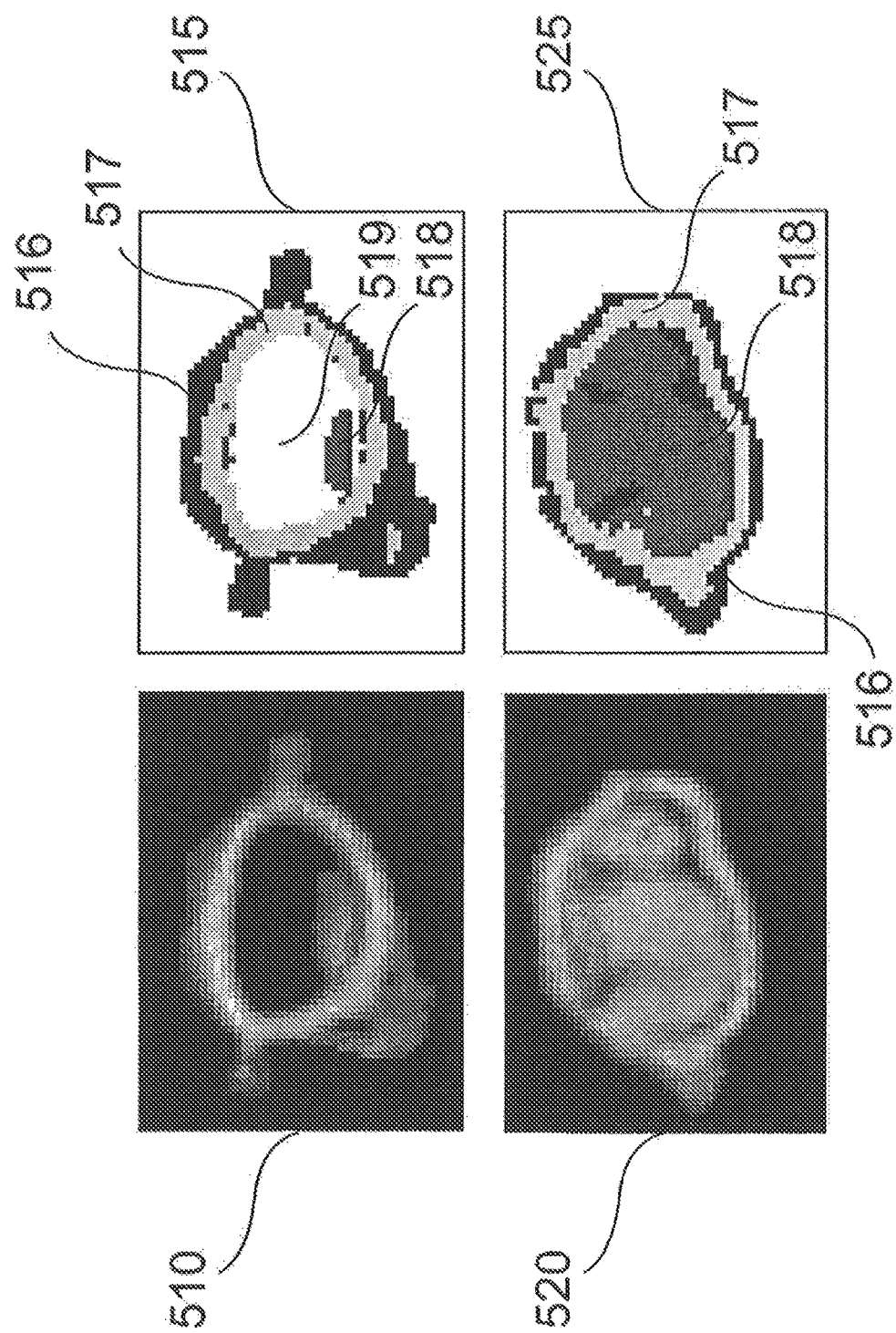
FIG. 5 shows computer-tomographic images of sugar beet seed and segmented views by methods according to a particularly preferred embodiment of the invention.

As explained previously, the method according to the invention comprises allocating the seedling features to anatomical units by automatic segmenting. The automatic segmenting is illustrated in FIG. 5. On the left hand side of FIG. 5 are shown two computer tomographic sectional images 510, 520 of a sugar beet seed in the form of low-resolution photographs. On the right hand side of the figure, there are segmented representations 515, 525 produced automatically by means of software. The segmented representations 515 and 525 show three or four segments or image areas 516-519 which may correspond for example to different anatomical units such as the features 401-404 in FIG. 4. The detection of the segments 516-519 from the sectional photographs 510 is carried out partly using grey-scale values but additionally, in particular, by the correlation of individual image data with serial photographs of sectional images and including correlations determined empirically from series of measurements.

In the seed shown in images 510 and 515, for example, a cavity 519 can be seen and has been allocated accordingly by the segmenting, this cavity not being present in the seed shown in images 520 and 525. The presence of a cavity inside a seed and its size can be used, for example, as a quality feature for evaluating seed properties.

FIG. 6 shows data by way of example obtained from 50 successive computer-tomographic photographs of sugar beet seed. The respective co-ordinates of the computer tomographic measurement (X- and Y-position and shift in the Z direction) are shown in columns X, Y and Z. The table also gives a total seed volume V in mm3 and a volume of a first segmented feature x and a second segmented feature y in mm3.

Figure 7:
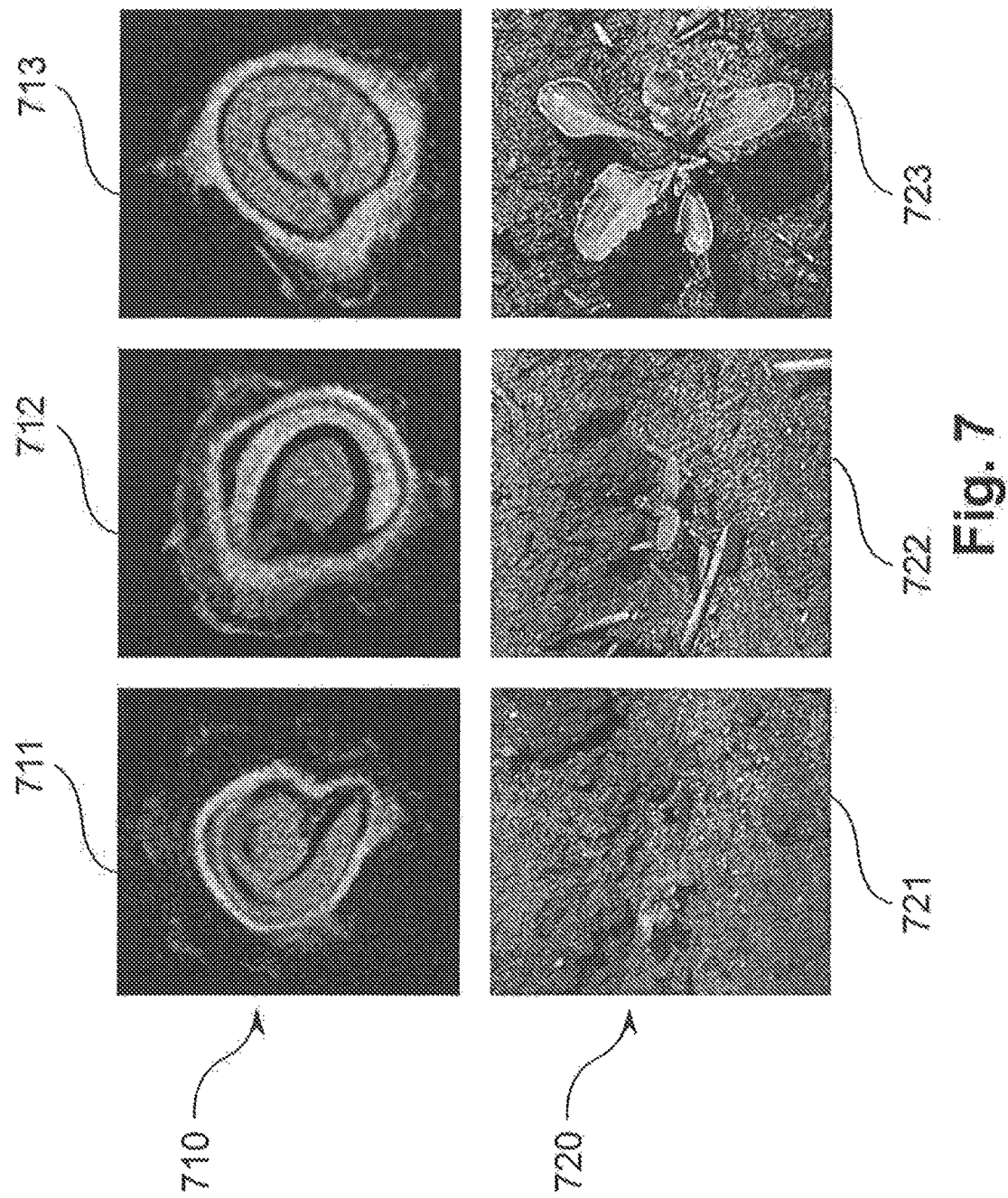
FIG. 7 shows computer-tomographic images of sugar beet seed according to a particular preferred embodiment of the invention and corresponding seedlings.

FIG. 7 shows a correlation between measurable seed properties and a plant quality resulting from them. 710 in FIG. 7 shows three computer tomographic images 711, 712 and 713 of three seeds which have been subjected to a segmenting and allocation process according to the invention.

Within the scope of the example shown in FIG. 7 a total seed volume and a cavity inside a seed (e.g. corresponding to the cavity 404 in FIG. 4 or the cavity 519 in FIG. 5) have been automatically detected. The values for the individual seeds 711, 712 and 713 are given (in mm3) in the following table:

| Feature | 711 | 712 | 713 |
|---|---|---|---|
| Seed volume | 2.80 | 3.52 | 4.19 |
| Cavity | 0.51 | 1.42 | 0.19 |

In line 720 of FIG. 7, seedlings 721, 722 and 723 corresponding to the seed are shown. It is clearly apparent that the seedlings 721 and 722 show a significantly worse growth performance than the seedling 723 corresponding to the seed 713. The different plant qualities can be put down both to different emergence times in the field and also to different starting sizes of the embryonic tissue. It has been established that, in particular, the size of a cavity inside a seed is clearly correlated with the plant quality obtained. In the case of the seed 713 in which this cavity is minimal, for example compared with the seed 712, a particularly early emergence in the field and hence particularly good quality of the seedling 723 were correlated.

By means of the seed or seedling features determined according to the invention, including for example a cavity inside a seed, it is possible to draw up a seed quality index determined from a number of parameters. This seed quality index makes it possible for example to make predictions as to the field emergence characteristics of corresponding seeds.

Figure 8:
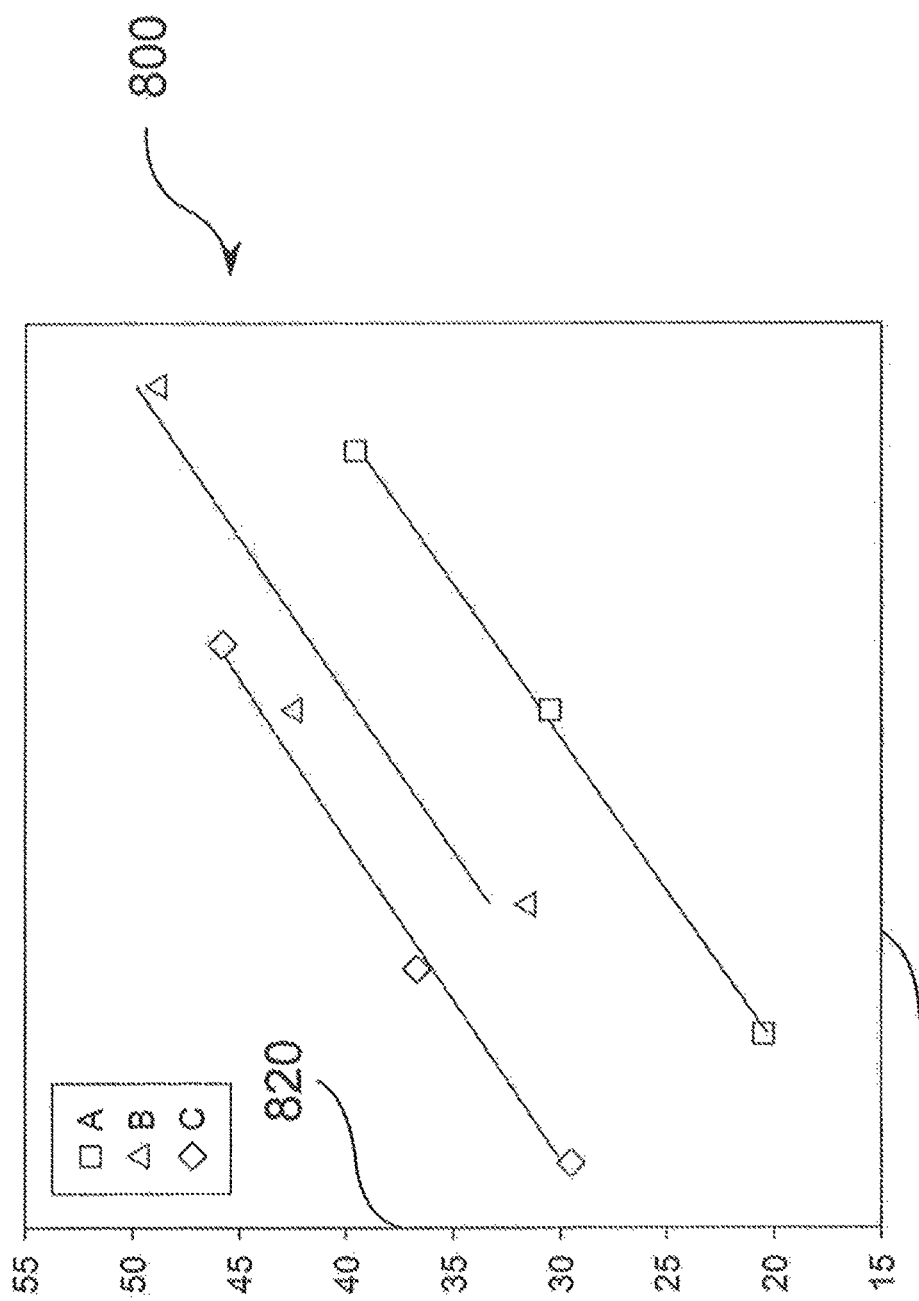
FIG. 8 shows a correlation of a seed quality index obtained according to a particularly preferred embodiment of the invention with a field emergence property in the case of sugar beet.

This situation is illustrated in FIG. 8. FIG. 8 shows a diagram 800 in which a correspondingly determined seed quality index of seed parts of different varieties is plotted on the x-axis 810 against the proportion of early germinated (desired) plants on the y-axis 820 as a percentage. The graph 800 shows a correlation between the quality of the seed described by a quality index and the early field emergence. The data represent the averages of three locations, in which seeds from a provenance or genetic type A, a genetic type B and a genetic type C were investigated. Within the individual genetic types a clear correlation can be detected between the seed quality index and the early field emergence.

The skilled man is aware that the field emergence characteristics of sugar beet seed correlate to the sugar beet sizes achieved subsequently. A seedling or seed with early or rapid field emergence, as explained above, has particularly fast access to water and/or nutrient salts and, thanks to having a sufficiently well developed leaf surface at an early stage, is able to make fully efficient use of its assimilation capabilities.

Figure 9:
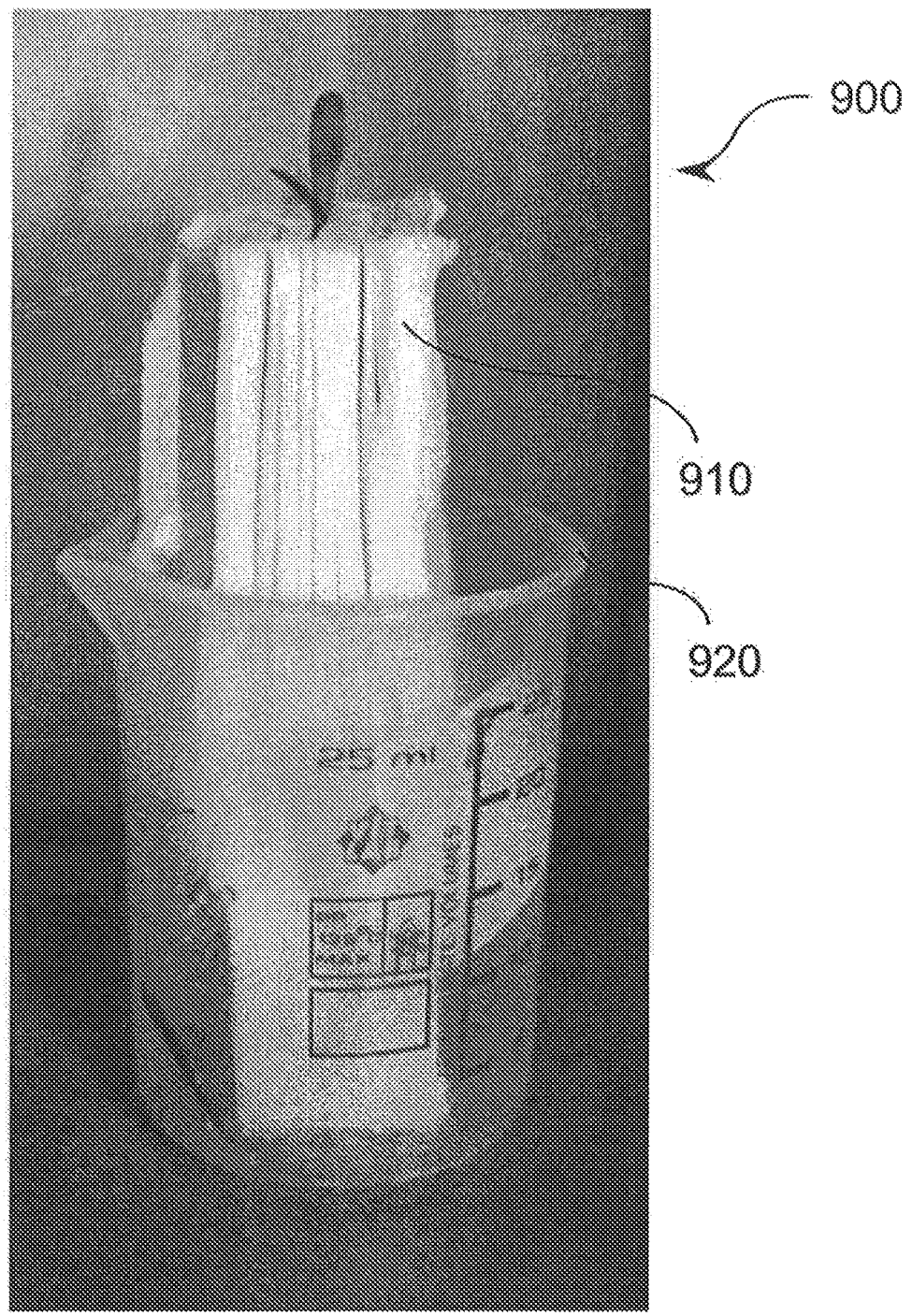
FIG. 9 shows a germination test in a vertical pleated filter according to a particularly preferred embodiment of the invention.

FIG. 9 shows a germination test proposed according to the invention in a vertical pleated filter, as described previously. The arrangement as a whole is designated 900.

A seed is introduced into a vertical pleated filter 910 and germinated in a moisture reservoir 920 in a vertical position. By compressing the pleated filter and/or varying the supply of moisture, different stress conditions can be simulated. During the germination of the seed there is repeated computer tomographic examination to obtain examination data at a particular time which can then be subjected to an evaluation method as described above.

Figure 10:
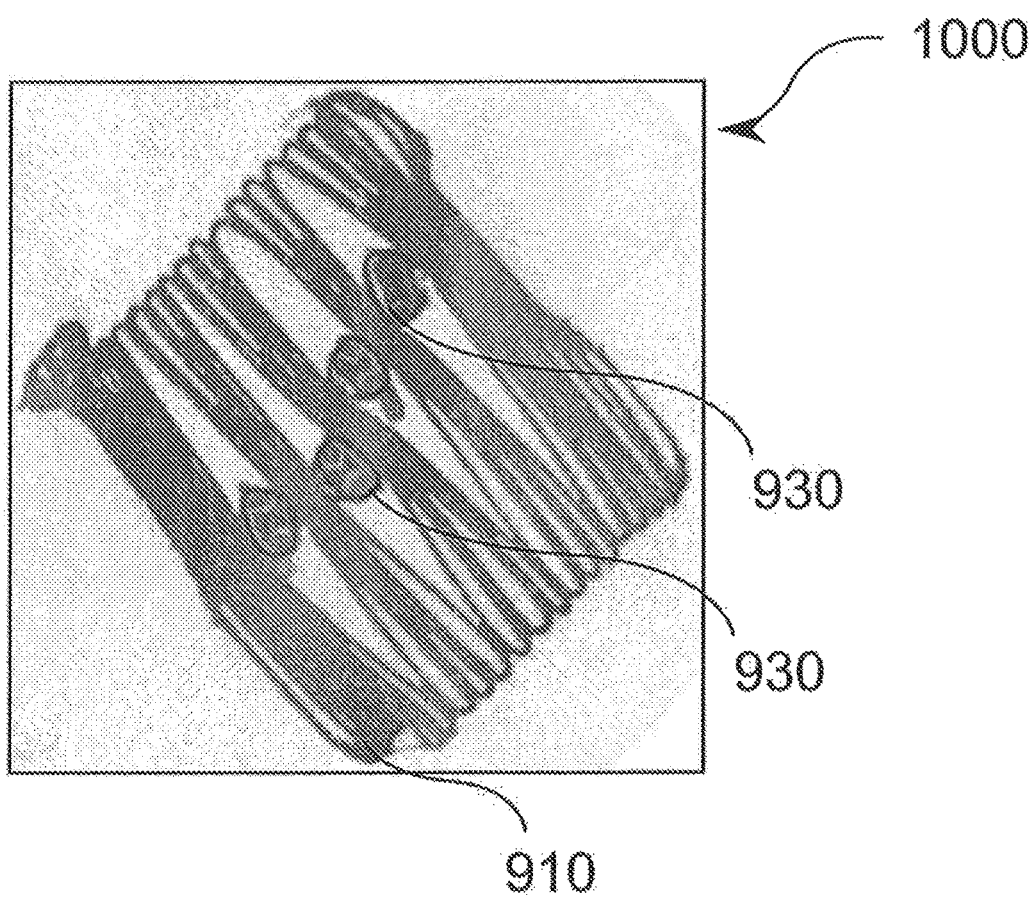
FIG. 10 shows computer tomographic images of ungerminated sugar beet seed according to a particularly preferred embodiment of the invention.

FIG. 10 shows a computer tomographic sectional image of a pleated filter 910 with dry seed 930 placed therein, obtained in this context. As explained previously, within the scope of this seedling test, images are taken layer by layer so that reconstructed three-dimensional data can be obtained.

Figure 11:
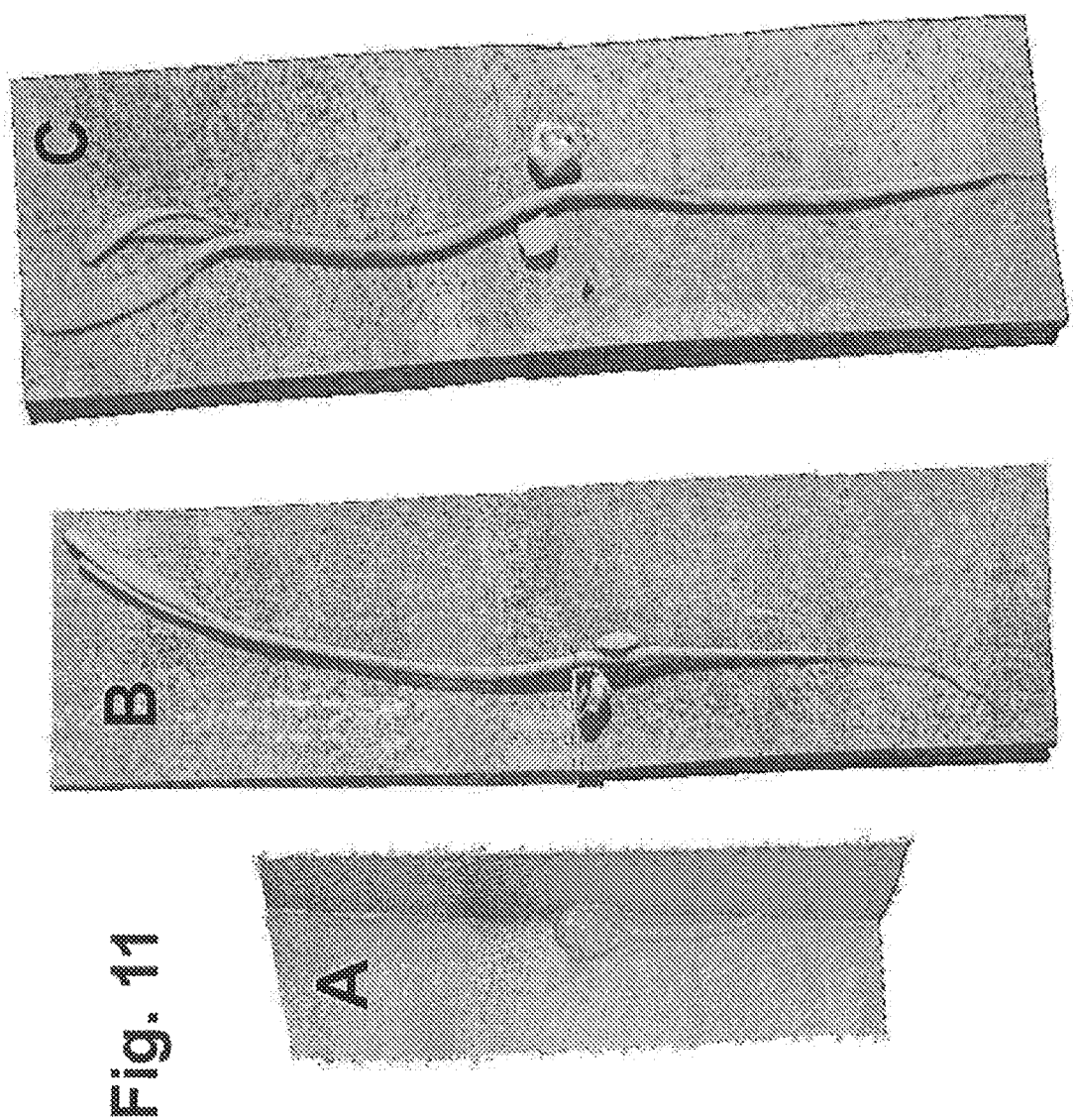
FIG. 11 shows 3D reconstructions of germinated sugar beet seed according to a particularly preferred embodiment of the invention.

FIGS. 11, 12 and 13 show corresponding 3D reconstructions which can be used for non-disruptive and non-destructive evaluation of germination properties.

The partial figures A in FIGS. 11, 12 and 13 denote photographs obtained three days after the appearance of the seedling, partial figures B are photographs obtained after six days and partial figures C show 7 day old seedlings. FIG. 11 shows maize, FIG. 12 shows sugar beet and FIG. 13 shows wheat seedlings. As already established previously, the proposed method is thus suitable for investigating a wide range of varieties and types of plants that are of agricultural and scientific relevance.

Figure 14:
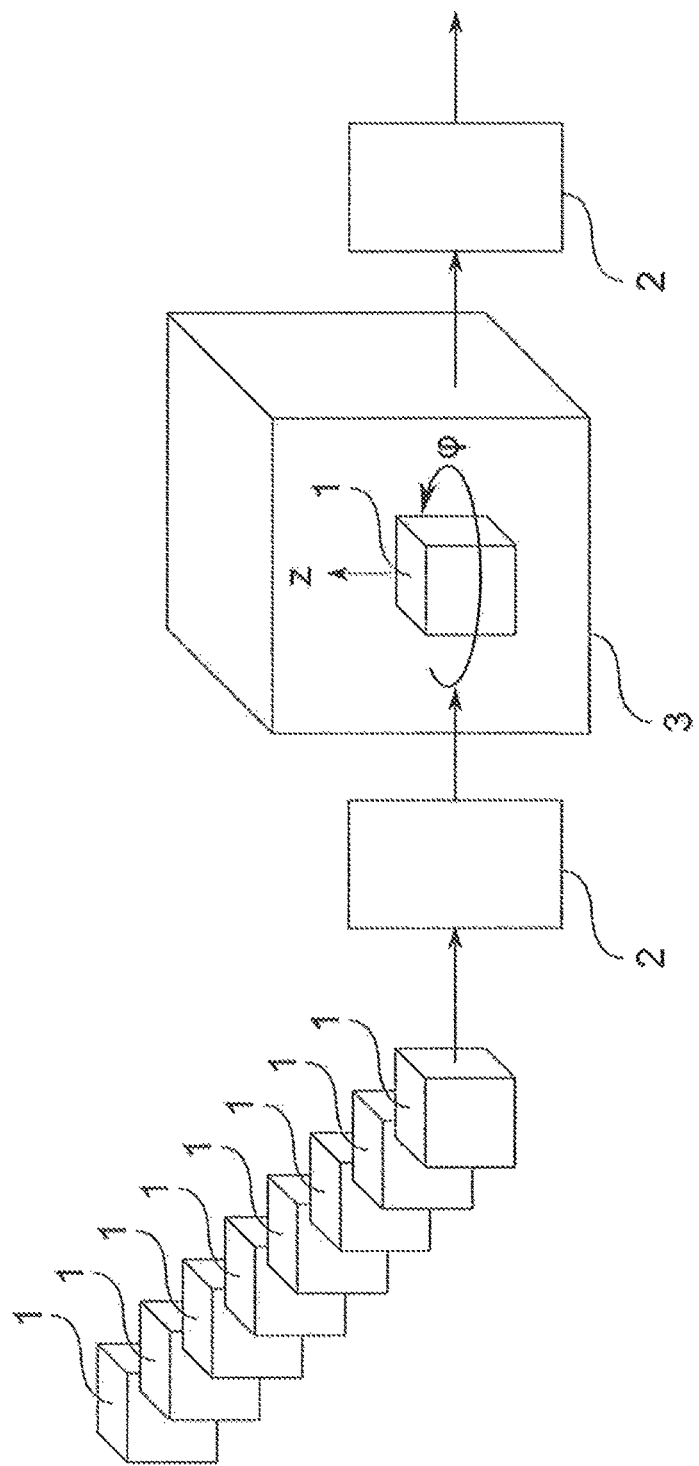
FIG. 14 shows a schematic representation of an arrangement for carrying out a process according to a particularly preferred embodiment of the invention.

FIG. 14 shows a schematic structure of a device for germinating and tomographically inspecting seeds and seedlings germinated from them in a dense medium, for example in filter paper as illustrated in FIGS. 9 to 13. The device may be used in particular for the automated evaluation of seedlings.

Reference numeral 1 denotes germination containers with seeds germinated in filter paper, soil or the like. The germination containers 1 are placed, by means of a transporting and displacement mechanism 2, in a tomography system 3 for non-destructive 3D inspection of the enclosed media and are subjected to spatially resolved tomography therein. After the examination the germination containers 1 are again conveyed through the transporting and displacement mechanism 2, for example placed in the germination chamber again.

The invention claimed is:

1. A method for automated objective evaluation of germination properties of plant seeds and of seedlings developing from the plant seeds, comprising:
   providing the plant seeds in a dense medium, including filter paper or soil, as a germination substrate;
   examining at least one of the plant seeds or developing seedlings a plurality of times in said dense medium using at least one imaging computer tomographic process to obtain three-dimensional, time point-related examination data (400) from a plurality of cross-sectional images according to a sequence of time during germination of the plant seeds into the seedlings;
   segmenting the three-dimensional, time point-related examination data (400), and allocating the segments (516-519) obtained to anatomical units of the plant seeds or seedlings, the anatomical units of the seedlings including one or more of the following: radicle, hypocotyl and cotyledons of the seedlings; and
   determining time point-related anatomical features (x, y), in the form of at least one of a volume, an area, and a dimension of the anatomical units of the plant seeds and seedlings from the allocated segments (516-519).

2. The method according to claim 1, wherein plant seeds in a dry state, moistened plant seeds and seedlings are examined at different examination times.

3. The method according to claim 1, further comprising:
   allocating the segments (516-519) obtained to anatomical units of the plant seeds, the anatomical units including one or more of the following: a hard pericarp, a soft pericarp, an embryo and an endosperm of the plant seeds.

4. The method according to claim 1, further comprising using the time point-related anatomical features (x, y) to determine one or more of the following: a germination capacity and germination quality of the plant seeds.

5. The method according to claim 1, wherein the evaluation of the germination properties includes detecting the time point-related anatomical features over a predetermined period of time.

6. The method according to claim 1, wherein the evaluation of the germination properties includes one or more of the following: comparing the time point-related anatomical features with comparative or threshold values, and statistically evaluating the time point-related anatomical features.

7. The method according to claim 1, wherein the evaluation of the germination properties includes correlating the time point-related anatomical features of seedlings with time point-related anatomical features of plant seeds.

8. The method according to claim 1, wherein the evaluation of the germination properties takes place while simulating stress factors.

9. The method according to claim 1, wherein the plant seeds and seedlings are taken in an enclosed germination container from a germination device before examination and/or returned to a germination device subsequently.

10. A device (200) for the automated objective evaluation of germination properties of plant seeds and of seedlings developing from the plant seeds on the basis of time point-related anatomical features (x, y), wherein the plant seeds and seedlings are located in a dense medium as a germination substrate, and wherein the time point-related anatomical features are determined in a staggered time sequence during the course of germination, the device comprising:
   a) an examining device (210) configured to examine the plant seeds and seedlings using at least one imaging computer-tomographic process to obtain three-dimensional, time point-related examination data (400) from a plurality of cross-sectional images;
   b) a segmenting device (230, 240) configured to segment the three-dimensional, time point-related examination data, said segmenting device being configured to segment the imaged plant seeds and seedlings from the germination substrate, and allocating the segments obtained (516-519) to anatomical units of the plant seeds and seedlings; and
   c) a deriving device (230, 240) configured to derive the time point-related anatomical features (x, y) in the form of at least one of a volume, an area and a dimension of the anatomical units of the plant seeds and seedlings from the allocated segments, said deriving device being configured to derive the anatomical features of at least the anatomical units of the radicle, the hypocotyl and/or the cotyledons of the seedlings.

11. The device according to claim 10, wherein the segmenting device and the deriving device include software stored on non-transitory computer-readable medium.

\* \* \* \* \*

UNITED STATES PATENT AND TRADEMARK OFFICE
CERTIFICATE OF CORRECTION

PATENT NO. : 8,935,881 B2  
APPLICATION NO. : 13/574298  
DATED : January 20, 2015  
INVENTOR(S) : Antje Wolff Page 1 of 1

It is certified that error appears in the above-identified patent and that said Letters Patent is hereby corrected as shown below:

Title page, after item (87) should read:

--(30)  Foreign Application Priority Data  
       Jan. 21, 2010   (DE) ........................ 102010011111.8--

Signed and Sealed this
Twenty-seventh Day of October, 2015

Michelle K. Lee
*Director of the United States Patent and Trademark Office*

UNITED STATES PATENT AND TRADEMARK OFFICE
CERTIFICATE OF CORRECTION

PATENT NO. : 8,935,881 B2  
APPLICATION NO. : 13/574298  
DATED : January 20, 2015  
INVENTOR(S) : Antje Wolff Page 1 of 1

It is certified that error appears in the above-identified patent and that said Letters Patent is hereby corrected as shown below:

Title page, after item (87) should read:

--(30) Foreign Application Priority Data  
Jan. 21, 2010  (DE) ..................... 10 2010 001 111.8--

Signed and Sealed this
Twenty-third Day of August, 2016

Michelle K. Lee
*Director of the United States Patent and Trademark Office*